June 25, 1929. J. A. DIRSCHAUER 1,718,638
AIR OPERATED AGRICULTURAL MACHINE
Filed Sept. 24, 1927
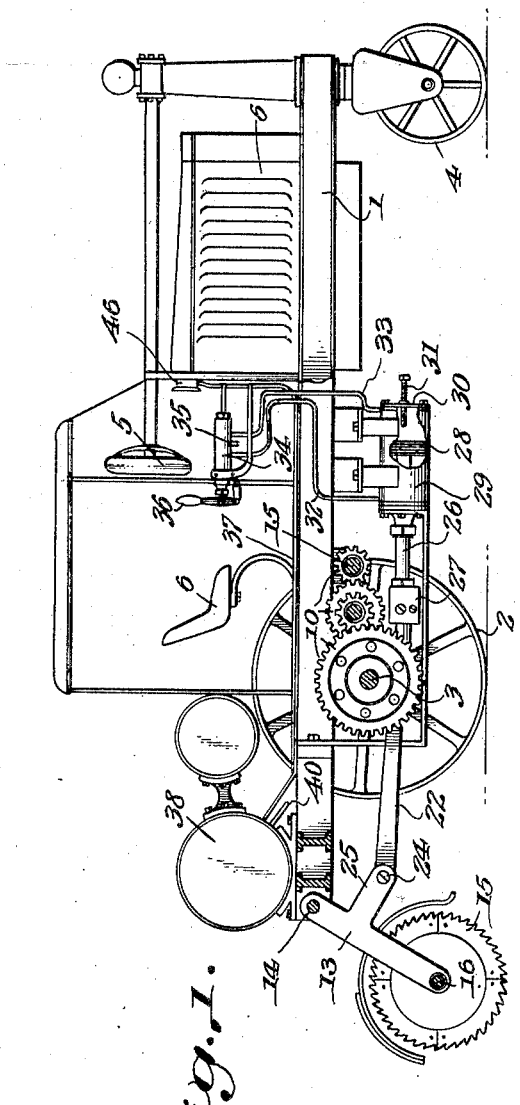
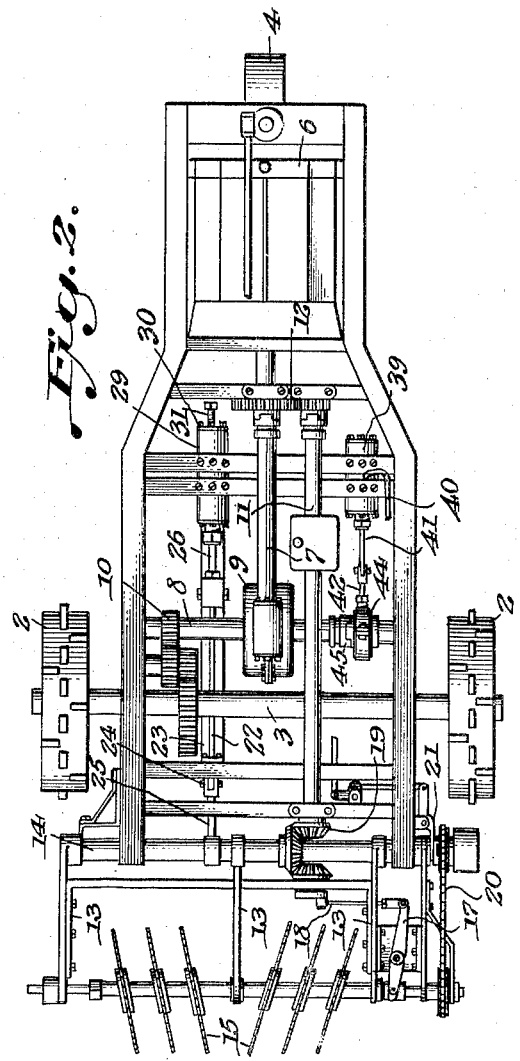
Inventor,
Jacob August Dirschauer
By [signature]
Atty.

Patented June 25, 1929.

1,718,638

UNITED STATES PATENT OFFICE.

JACOB AUGUST DIRSCHAUER, OF EVANSVILLE, INDIANA.

AIR-OPERATED AGRICULTURAL MACHINE.

Application filed September 24, 1927. Serial No. 221,770.

This invention relates to agricultural machines of that general class having power means for raising and lowering a gang of cutters to control the depth to which they will penetrate the soil or to hold them in raised position, clear of the surface on which the machine is standing or travelling.

My invention embodies, more particularly, improvements relating to the operation of the air compressor or pump from the axle of the machine; the direct mechanical operation of the swinging frame carrying the rotary discs or cutters by utilizing a cylinder and piston, a connecting rod and an arm, whereby a positive push or pull is exerted when swinging the disc carrying frame to raise or lower it, including means for regulating the stroke of the piston of the power cylinder, and the controlling valve and connections whereby the operator may conveniently exercise control of the air pressure to bring about any desired positioning of the gang of discs or cutters.

My present invention represents improvements on the power operating means set forth in my joint application with Arthur Dick, filed October 16, 1926, Serial No. 142,046.

The arrangement of the gangs of cutters or discs is also shown in my joint application Serial No. 142,046 and illustration is given herein to disclose one example of discs or cutters with which my present improvements may be used.

Other improved means illustrated in connection with the gang of discs is set forth and claimed in my application, filed August 25, 1927, Serial No. 215,476 but it will be understood that neither the illustrated arrangement of cutters or discs nor the special improvements in connection with them need be used in connection with my present air operated means for raising and lowering a gang or gangs of cultivating discs as the present improvements may be used in connection with any gang or gangs of discs carried by a movably mounted frame.

In the accompanying drawings:

Figure 1 is a side elevation, partly in section, of an agricultural machine provided with the present improvements; and Fig. 2 is a plan view thereof.

The frame of the machine appears at 1 and has traction wheels 2 fixed to an axle 3, and a caster wheel 4, operated by a steering wheel 5 located adjacent the driver's seat 6, which enables the machine to be steered. Any suitable power plant, such as an internal combustion engine, is located under the hood 6, the shaft of such power plant driving the propeller shaft 7 through any suitable clutch, said shaft 7 driving a jack shaft 8 through any suitable gearing 9. The jack shaft 8 is operatively connected to the shaft 3 by reducing gearing 10 by which the traction wheels are turned by power derived from the engine.

In accordance with the disclosures of my application filed August 25, 1927, Serial No. 215,476 I may provide a shaft 11 driven by gearing 12 from the engine shaft and provided with a suitable clutch for its control. This shaft is used for operating the improved means of said application for bodily shifting the cutters or discs transversely of the direction of travel of the machine.

The frame which carries the cutters or discs appears at 13 and is swingingly or rockably carried by a shaft 14 suitably mounted in the frame 1. The cutters or discs 15 are arranged in gangs, being carried by a shaft 16 which is mounted in the frame 13. These cutters or discs may be arranged as disclosed in my joint application Serial No. 142,046 filed October 16, 1926, or otherwise, as it is not essential to the present invention just what arrangement of discs or cutters, or their form of construction, be resorted to.

Although not forming a part of the present invention, the shaft 16 carrying the cutters or discs may be shifted bodily laterally of the machine or transversely to its path of travel by means operated from the shaft 11, as disclosed in my application filed August 25, 1927, Serial No. 215,476, the mechanism of this character is shown at 17, 18, 19.

The shaft 16 may be driven from shaft 14 by chain and sprocket gearing 20 which is under the control of a suitable clutch 21 adapted to be thrown in or out by the operator by some control located conveniently to the driver's seat 6.

My present improvements over the disclosures of the applications herein before set forth, reside in the mechanism now to be described.

To enable the swinging frame 13 and the gangs of discs 15 to be raised or lowered as may be desired so that the discs will penetrate the soil to the extent required, or, may be elevated clear of the surface, I provide a connecting rod 22 which is suitably guided at 23 and is pivoted at 24 to an arm 25 attached to the frame 13 or to any suitable part of the structure which carries the cutters or discs 15. The connecting rod is connected to the piston rod 26 by a cross head 27 which may be suitably guided, said piston rod carrying a piston 28 which operates in the cylinder 29 that is suitably supported from the frame 1. Located centrally of the forward cylinder head 30 and engaged with a screw threaded opening therein, is a regulating screw 31 which may be adjusted forwardly or rearwardly to limit the forward travel of the piston 28 and, consequently, the extent to which the cutters 15 may be lowered into the soil. The tip of the screw 31 serves as an abutment against which the piston strikes on its forward travel. The cylinder 29 has pipes 32, 33 leading to opposite sides of the piston 28 from a valve casing or shell 34 which is suitably mounted adjacent the driver's seat and has an exhaust port or pipe 35. A valve, not shown, contained within the shell 34 and operated by a handle or lever 36 arranged for convenient manipulation by the driver, is used to control the flow of the motive fluid into the pipes 32, 33 and through the exhaust 35.

According to the manipulation and setting of the valve, the piston 28 will be shifted and held as may be necessary to arrange the cutters 15 at the desired height and to hold them where set.

A motive fluid supply pipe 37 leading to the casing 34 from a motive fluid pressure tank 38, supplies the pressure necessary for operating the piston 28.

For the purpose of supplying the pressure to the tank 38, there is provided an air compressor 39, suitably carried by frame 1 and comprising a cylinder and piston with suitable arrangements and valves whereby operation of the piston will compress air in said cylinder and the air therefrom will be forced through a pipe 40 to the tank 38, it being understood that a suitable check admission valve arrangement be provided where necessary. The piston rod of the compressor 39 is shown at 41 and is connected to the arm 42 and carried by the strap of an eccentric 44 on the jack shaft 8. A clutch 45, operated by any suitable means, enables the operator to connect the eccentric 44 to the jack shaft 8, or to dis-connect it therefrom, so that when the air pressure gauge 46 shows that the pressure is adequate, the clutch 45 can be thrown out.

By operating the valve handle 36, the motive fluid or air pressure can be admitted to either side of the piston 28 to raise or lower the frame 13 and hence the cutters 15, as may be desired.

What I claim is:

1. In an agricultural machine, the combination with an hinged frame mounted for up and down swinging carrying soil treating devices, of power-operated means for raising and lowering said frame comprising a movable piston and a stationary cylinder, an arm connected to the hinged frame, a connecting rod attached to the piston and to said arm and an adjustable stop adapted to be abutted by the piston to limit the extent of movement of the operating means.

2. In an agricultural machine, the combination with a frame mounted for up and down movement carrying soil treating devices, of power-operated means for raising and lowering said frame comprising a controllable air compressor operated by said machine, a tank or reservoir for accumulating the air compressed by said compressor, a piston and cylinder having a positive push-and-pull connection with the frame, a valve for controlling the admission and exhaust of compressed air from the reservoir to the piston and cylinder, and an adjustable screw carried by the cylinder and projecting into the interior thereof and serving as a stop to directly engage the piston to limit the movement of said piston.

In testimony whereof I affix my signature.

JACOB AUGUST DIRSCHAUER.